(12) United States Patent
Kim et al.

(10) Patent No.: US 11,150,764 B2
(45) Date of Patent: Oct. 19, 2021

(54) TOUCH APPARATUS AND TOUCH DETECTION METHOD THEREOF

(71) Applicant: HiDeep Inc., Seongnam-si (KR)

(72) Inventors: Seyeob Kim, Seongnam-si (KR);
Hwanhee Lee, Seongnam-si (KR);
Bonkee Kim, Seongnam-si (KR)

(73) Assignee: HIDEEP INC., Seongnam-si (KR)

(*) Notice: Subject to any disclaimer, the term of this patent is extended or adjusted under 35 U.S.C. 154(b) by 0 days.

(21) Appl. No.: 16/744,427

(22) Filed: Jan. 16, 2020

(65) Prior Publication Data

US 2020/0233526 A1 Jul. 23, 2020

(30) Foreign Application Priority Data

Jan. 22, 2019 (KR) .................. 10-2019-0008374

(51) Int. Cl.
*G06F 3/041* (2006.01)

(52) U.S. Cl.
CPC ........ *G06F 3/0418* (2013.01); *G06F 3/04162* (2019.05); *G06F 3/04166* (2019.05); *G06F 2203/04104* (2013.01)

(58) Field of Classification Search
CPC ............... G06F 3/0418; G06F 3/04162; G06F 3/04166; G06F 2203/04104; G06F 3/0441
See application file for complete search history.

(56) References Cited

U.S. PATENT DOCUMENTS

| 2012/0068964 | A1  | 3/2012 | Wright et al. |
| 2017/0131798 | A1* | 5/2017 | Geaghan ............... G06F 3/0441 |
| 2018/0113549 | A1* | 4/2018 | Park ..................... G06F 3/03545 |
| 2019/0187856 | A1* | 6/2019 | Bruwer .................. G06F 3/044 |

FOREIGN PATENT DOCUMENTS

| KR | 10-2014-0095734 | 8/2014 |
| KR | 10-2015-0046899 | 5/2015 |
| KR | 10-2016-0025443 | 3/2016 |
| KR | 10-2017-0078494 | 7/2017 |

OTHER PUBLICATIONS

KIPO, Search Report & Written Opinion of PCT/KR2020/000777 dated Apr. 24, 2020.

* cited by examiner

*Primary Examiner* — Sahlu Okebato
(74) *Attorney, Agent, or Firm* — Lex IP Meister, PLLC

(57) ABSTRACT

An exemplary embodiment of the present invention provides a touch apparatus including: a touch panel configured to include a plurality of touch electrodes; a touch driver configured to apply a first driving signal to a first touch electrode of the touch electrodes during a first period, and a second driving signal to the touch electrodes during a second period subsequent to the first period; and a touch controller configured to determine a detection signal as a valid touch signal based on whether a signal strength of the detection signal received in response to the first driving signal exceeds a first threshold during the first period, wherein the detection signal include at least one of a first detection signal generated by a first touch object and a second detection signal generated by a second touch object, and the first detection signal is determined as a valid touch signal, while the first threshold is set to filter the second detection signal.

18 Claims, 17 Drawing Sheets

TOUCH APPARATUS AND TOUCH DETECTION METHOD THEREOF

CROSS-REFERENCE TO RELATED APPLICATION

This application claims priority to and benefits of Korean Patent Application No. 10-2019-0008374 filed in the Korean Intellectual Property Office on Jan. 22, 2019, the entire contents of which are incorporated herein by reference.

BACKGROUND OF THE INVENTION (a) Field of the Invention

The present disclosure relates to a touch apparatus and a touch detection method thereof.

(b) Description of the Related Art

Various terminals such as mobile phones, smart phones, tablet PCs, laptop computers, digital broadcasting terminals, PDAs (personal digital assistants), PMPs (portable multimedia players), and navigation devices include touch sensors.

In such a terminal, a touch sensor may be disposed on a display panel displaying an image, or may be disposed in an area of a terminal body. As a user interacts with the terminal by touching the touch sensor, the terminal may provide the user with an intuitive user interface.

The user may use a stylus pen for sophisticated touch input. The stylus pen may transmit and receive signals to and from the touch sensor in an electrical and/or magnetic manner.

According to a conventionally used driving method, a position of an object in contact with the touch sensor is calculated by using a signal received during a period in which a driving signal is applied to touch electrodes included in the touch sensor, and a type of the object (e.g., a finger, a stylus pen, a palm, etc.) touching the touch sensor is identified by using a signal received during a period of not applying the driving signal.

However, when different types of objects come in contact with the touch sensor together, received signals by each of the objects are not distinguished, so that a position of each object is difficult to accurately calculate.

The above information disclosed in this Background section is only for enhancement of understanding of the background of the invention and therefore it may contain information that does not form the prior art that is already known in this country to a person of ordinary skill in the art.

SUMMARY OF THE INVENTION

The exemplary embodiments have been made in an effort to provide a touch apparatus and a touch detection method thereof for accurately calculating touch positions of different objects.

For achieving the objects or other objects, an aspect of the present invention provides a touch apparatus including: a touch panel configured to include a plurality of touch electrodes; a touch driver configured to apply a first driving signal to a first touch electrode of the touch electrodes during a first period, and a second driving signal to the touch electrodes during a second period subsequent to the first period; and a touch controller configured to determine a detection signal as a valid touch signal based on whether a signal strength of the detection signal received in response to the first driving signal exceeds a first threshold during the first period, wherein the detection signal include at least one of a first detection signal generated by a first touch object and a second detection signal generated by a second touch object, and the first detection signal is determined as a valid touch signal, while the first threshold is set to filter the second detection signal.

The touch driver may receive only a third detection signal generated by the second touch object in response to the second driving signal during the second period.

The third detection signal may be determined as a valid touch signal based on whether signal strength of the third detection signal exceeds a second threshold.

The touch controller may calculate an area of a touch area by using the valid touch signal, and may generate information for identifying a touch object as the first touch object or the second touch object depending on a size of the area.

The touch controller may generate information identifying that the touch object is the second touch object when the area is less than or equal to a threshold.

The second touch object may be a stylus pen.

The touch controller may generate information identifying that the touch object is the first touch object when the area exceeds a threshold.

The first touch object may include at least one of a finger and a palm.

The first driving signal may be a pulse signal with a first frequency, the second driving signal may be a pulse signal having a second frequency, and the first frequency and the second frequency may be different from each other.

The touch driver may apply the second driving signal to all of the touch electrodes in phase during the second period, and may receive a detection signal from all of the touch electrodes when the second driving signal has a disable level.

The touch driver may apply the second driving signal during the first sub period in the second period, and may stop applying the second driving signal during the second sub period in the second period.

The touch driver may apply the second driving signal during the first sub period in the second period, and may apply a third driving signal having a different ratio of a disable level period to an enable level period to all of the touch electrodes in one repeated cycle by comparing it with the second driving signal during the second sub period in the second period.

The third driving signal may have a ratio of the disable level period to the enable level period, which is at least one of a:2b+1, a:2b+2, a:2b+3, a:2b+4, a:(3b+1), a:2(b+3)+1, a:2(b+3), and a:(2b+1), in one repeated cycle, and a and b may be positive integers.

The touch electrodes may include the first touch electrodes and the second touch electrodes, the first touch electrodes may extend in a first direction and may be arranged in a second direction crossing the first direction, and the second touch electrodes may extend in the second direction and may be arranged in the first direction.

The touch driver may receive a detection signal from all of the second touch electrodes while applying the first driving signal to the first touch electrode.

The touch driver may include a first driver connected with the first touch electrodes and a second driver connected with the second touch electrodes, and the first driver may include a differential amplifier connected to two first touch electrodes and an ADC unit for converting the differentially amplified signal into a digital signal.

An exemplary embodiment of the present invention provides a touch detection method including: applying a first driving signal to a first touch electrode among a plurality of touch electrodes included in a touch panel during a first period; applying a second driving signal to the touch electrodes during a second period after the first period; determining a detection signal as a valid touch signal based on whether a signal strength of the detection signal received in response to the first driving signal exceeds a first threshold during the first period; and calculating touch coordinates by using the valid touch signal, wherein the detection signal include at least one of a first detection signal generated by a first touch object and a second detection signal generated by a second touch object, and the first detection signal is determined as a valid touch signal and the first threshold is set to filter the second detection signal.

The touch detection method may further include: receiving only a third detection signal generated by the second touch object in response to the second driving signal during the second period; and determining the third detection signal as a valid touch signal based on whether a signal strength of the third detection signal exceeds a second threshold.

The touch detection method may further include: calculating an area of a touch area by using the valid touch signal; and generating information for identifying a touch object as the first touch object or the second touch object depending on a size of the area.

The generating of the information for identifying the touch object may include generating information identifying that the touch object is the second touch object when the area is less than or equal to a threshold.

The generating of the information for identifying the touch object may include generating information identifying that the touch object is the first touch object when the area exceeds a threshold, and the first touch object may include at least one of a finger and a palm, while the second touch object may be a stylus pen The applying of the first driving signal to the first touch electrode among the touch electrodes included in the touch panel during the first period may include receiving a detection signal from all of the second touch electrodes while applying the first driving signal to the first touch electrode.

The applying of the second driving signal to the touch electrodes during second period that is continuous to the first period may include: applying the second driving signal to all of the touch electrodes in phase during the second period; and receiving a detection signal from all of the touch electrodes when the second driving signal has a disable level.

According to the exemplary embodiments, a touch position generated by a stylus pen may be detected when a human body and the stylus pen simultaneously contact each other.

According to the exemplary embodiments, it is possible to accurately calculate positions of different types of touch objects.

DETAILED DESCRIPTION OF THE EMBODIMENTS

Figure 1:
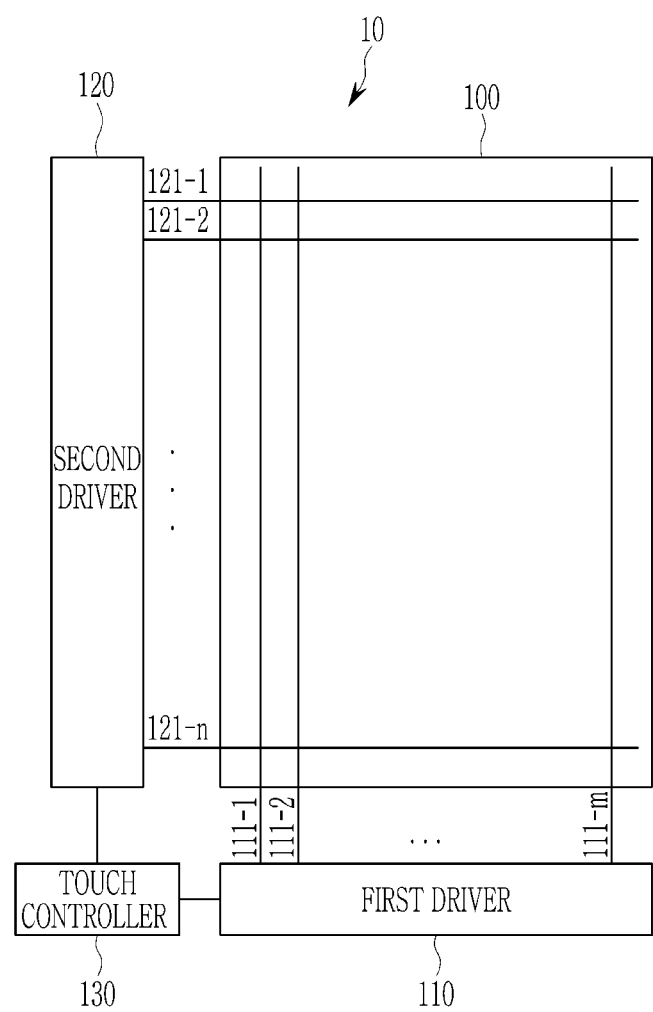
FIG. 1 schematically illustrates a touch apparatus according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

Further, since sizes and thicknesses of constituent elements shown in the accompanying drawings are arbitrarily given for better understanding and ease of description, the present invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, the word "over" or "on" means positioning on or below the object portion, and does not necessarily mean positioning on the upper side of the object portion based on a gravity direction.

In addition, unless explicitly described to the contrary, the word "comprise" and variations such as "comprises" or "comprising" will be understood to imply the inclusion of stated elements but not the exclusion of any other elements.

Hereinafter, a touch apparatus and a touch detection method thereof according to exemplary embodiments will be described with reference to necessary drawings.

Figure 2:
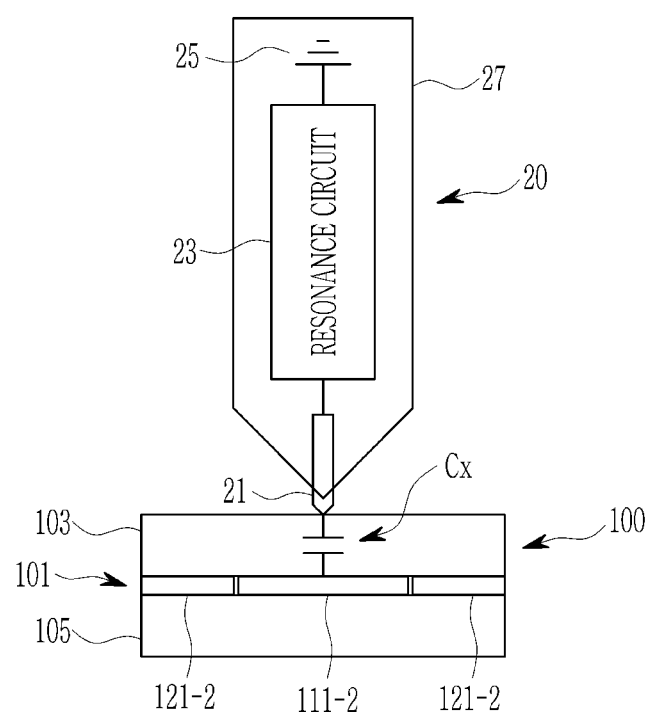
FIG. 2 illustrates an example in which a stylus pen is touched on a touch apparatus according to an exemplary embodiment.

FIG. 1 schematically illustrates a touch apparatus according to an exemplary embodiment, and FIG. 2 illustrates an example in which a stylus pen is touched on a touch apparatus according to an exemplary embodiment.

Referring to FIG. 1, a touch apparatus 10 according to an exemplary embodiment may include a touch panel 100, first and second drivers 110 and 120 driving the touch panel 100, and a controller 130.

The touch panel 100 includes a plurality of first touch electrodes 111-1 to 111-$m$ having a form extending in a first direction, and a plurality of second touch electrodes 121-1 to 121-$n$ having a form extending in a second direction crossing the first direction. In the touch panel 100, the first touch electrodes 111-1 to 111-$m$ may be arranged along the second direction, and the second touch electrodes 121-1 to 121-$n$ may be arranged along the first direction. In FIG. 1, a shape of the touch panel 100 is illustrated as a quadrangle, but the present invention is not limited thereto.

As illustrated in FIG. 2, the touch panel 100 further includes a substrate 105 and a window 103. The first touch electrodes 111-1 to 111-$m$ and the second touch electrodes 121-1 to 121-$n$ may be disposed on the substrate 105. The window 103 may be disposed on the first touch electrodes 111-1 to 111-$m$ and the second touch electrodes 121-1 to 121-$n$. In FIG. 2, the first touch electrodes 111-1 to 111-$m$ and the second touch electrodes 121-1 to 121-$n$ are illustrated to be disposed on a same layer, but may be on different layers, respectively, and the present invention is not limited thereto.

The first touch electrodes 111-1 to 111-$m$ are connected to the first driver 110, and the second touch electrodes 121-1 to 121-$n$ are connected to the second driver 120. In FIG. 1, the first driver 110 and the second driver 120 are separated from each other, but may be implemented as one module, unit, or chip, and the present invention is not limited thereto.

The first driver 110 may apply a driving signal to the first touch electrodes 111-1 to 111-$m$. In addition, the first driver 110 may receive a detection signal from the first touch electrodes 111-1 to 111-$m$. Similarly, the second driver 120 may apply a driving signal to the second touch electrodes 121-1 to 121-$n$. In addition, the second driver 120 may receive a detection signal from the first touch electrodes 121-1 to 121-$n$. That is, the first driver 110 and the second driver 120 may be a type of transceiver for transmitting and receiving signals.

The driving signal may include a signal (e.g., a sine wave, a square wave, etc.) having a frequency corresponding to a resonant frequency of a stylus pen 20. The resonance frequency of the stylus pen 20 depends on a design value of a resonant circuit portion 23 of the stylus pen.

The touch apparatus 10 may be used to detect a touch input (direct touch or proximity touch) by a touch object. As illustrated in FIG. 2, the touch input of the stylus pen 20 proximate to the touch panel 100 may be sensed by the touch apparatus 10.

The stylus pen 20 may include a conductive tip 21, the resonant circuit portion 23, a ground 25, and a body 27.

The conductive tip 21 may be at least partially formed of a conductive material (e.g., a metal, a conductive rubber, a conductive fabric, a conductive silicon, etc.), and may be electrically connected to the resonant circuit portion 23.

The resonant circuit portion 23, which is an LC resonant circuit, may resonate with a driving signal applied from at least one of the first driver 110 and the second driver 120 to at least one kind of all electrodes among the first touch electrodes 111-1 to 111-$m$ and the second touch electrodes 121-1 to 121-$n$ through the conductive tip 21.

A resonance signal generated when the resonant circuit portion 23 resonates with the driving signal may be outputted to the touch panel 100 through the conductive tip 21. The driving signal caused by the resonance of the resonant circuit portion 23 may be transferred to the conductive tip 21 during a period in which the driving signal is applied to at least one kind of all electrodes among the first touch electrodes 111-1 to 111-$m$ and the second touch electrodes 121-1 to 121-$n$ and during a following period. The resonant circuit portion 23 may be disposed in the body 27, and may be electrically connected to the ground 25.

The stylus pen 20 in this manner generates a touch input by generating a resonance signal in response to a driving signal applied to at least one of the touch electrodes 111-1 to 111-$m$ and 121-1 to 121-$n$.

Capacitance Cx is generated by at least one of the touch electrodes 111-1 to 111-$m$ and 121-1 to 121-$n$, and the conductive tip 21 of the stylus pen 20. The driving signal and the resonance signal may be respectively transferred to the stylus pen 20 and the touch panel 100 through the capacitance Cx generated by at least one of the touch electrodes 111-1 to 111-$m$ and 121-1 to 121-$n$, and the conductive tip 21 of the stylus pen 20.

The touch apparatus 10 may detect a touch by a touch object (e.g., a user's body (finger, palm, etc.), or a passive or active stylus pen other than the stylus pen 20 using the above-described method of generating the resonance signal.

For example, the touch apparatus 10 detects a touch by a stylus pen that receives an electrical signal and outputs it as a magnetic field signal. For example, the touch apparatus 10 may further include a digitizer. A touch may be detected by detecting the magnetic field signal that is electromagnetically resonant (or electromagnetically induced) by the stylus pen by the digitizer. Alternatively, the touch apparatus 10 detects a touch by a stylus pen which receives a magnetic field signal and outputs it as a resonant magnetic field signal. For example, the touch apparatus 10 may further include a coil for applying a current as a driving signal, and the digitizer. The stylus pen resonates with a magnetic field signal generated by the coil to which the current is applied. A touch may be detected by detecting the magnetic field signal that is electromagnetically resonant (or electromagnetically induced) by the stylus pen by the digitizer.

The controller 130 may control driving of the touch apparatus 10, and may output touch coordinate information in response to a touch detection result of the touch apparatus 10.

Next, a touch detection method according to an exemplary embodiment of the present invention will be described with reference to FIG. 3.

Figure 3:
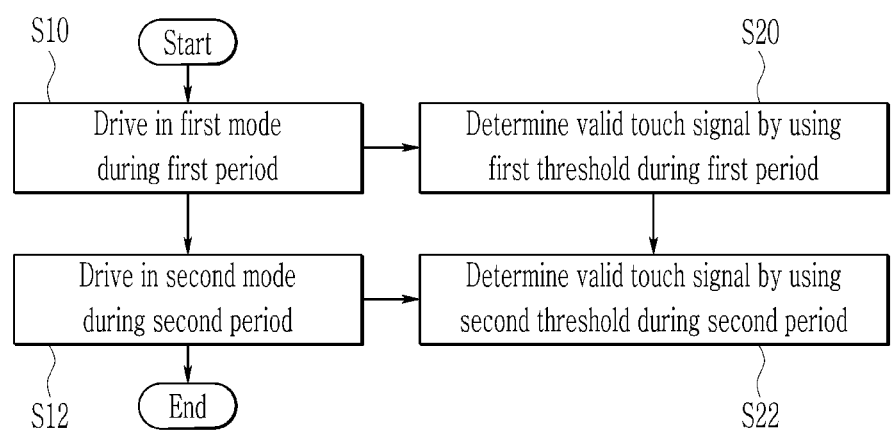
FIG. 3 schematically illustrates a touch detection method according to an exemplary embodiment.

FIG. 3 schematically illustrates a touch detection method according to an exemplary embodiment.

In a first period, the touch apparatus 10 is driven in a first mode (S10). The first mode is a mode in which a driving signal for detecting a touch input by a touch object other than the stylus pen 20 is applied to the touch panel 100.

For example, in the first mode, the first driver 110 outputs a driving signal to the first touch electrodes 111-1 to 111-$m$, and the second driver 120 receives a sensing signal depending on a touch from the second touch electrodes 121-1 to 121-$n$.

The controller 130 determines whether the detection signal is a valid touch signal based on whether a signal magnitude of the detection signal acquired during the first period exceeds a first threshold (S20). The controller 130 may obtain touch coordinate information by using the valid touch signal.

For example, the controller 130 calculates touch coordinates by using the detection signal when the signal magnitude of the detection signal acquired during the first period exceeds the first threshold. The controller 130 does not calculate touch coordinates depending on the detection signal having a signal magnitude that is less than or equal to the first threshold when the signal magnitude of the detection signal acquired in the first period is less than or equal to the first threshold. In addition, when the signal magnitude of the detection signal acquired in the first period exceeds the first threshold, the controller 130 may calculate a touch area by using the detection signal. The detection signal acquired in the first period includes at least one of a first detection signal generated by a user's body part (a finger, a palm, etc.), and a second detection signal generated by the stylus pen 20 or a passive stylus pen. The first threshold may be set such that the first detection signal is determined to be a valid touch signal and the second detection signal is filtered.

In a second period, the touch apparatus 10 is driven in a second mode (S12). The second mode is a mode in which a driving signal for detecting a touch input by the stylus pen 20 is applied to the touch panel 100 and a resonant signal is received based on the driving signal.

For example, the first driver 110 simultaneously applies a driving signal to all of the first touch electrodes 111-1 to 111-$m$. The resonant circuit portion 23 of the stylus pen 20 resonates with the driving signal, thereby generates a resonant signal, which is transferred to the touch panel 100 through the conductive tip 21. Then, the first driver 110 receives detection signals transferred from the first touch electrodes 111-1 to 111-$m$, and the second driver 120 receives sensing signals transferred from the second touch electrodes 121-1 to 121-$n$. The first driver 110 and the second driver 120 may process the received detection signals to transfer them to the controller 130.

Although it has been described in the above description that the first driver 110 simultaneously applies driving signals to all of the plurality of first touch electrodes 111-1 to 111-$m$ during the second period, the second driver 120 may simultaneously apply driving signals to all of the second touch electrodes 121-1 to 121-$n$ during the second period, or the first driver 110 and the second driver 120 may simultaneously apply driving signals to all of the first touch electrodes 111-1 to 111-$m$ and all of the second touch electrodes 121-1 to 121-$n$. When the first driver 110 and the second driver 120 provide driving signals to both the plurality of first touch electrodes 111-1 to 111-$m$ and the plurality of second touch electrodes 121-1 to 121-$n$, it is assumed that phases of the driving signals applied to the first touch electrodes 111-1 to 111-$m$ and the driving signals applied to the second touch electrodes 121-1 to 121-$n$ are the same, but the present invention is not limited thereto.

The controller 130 determines whether the detection signal is a valid touch signal based on whether a signal magnitude of the detection signal acquired during the second period exceeds a second threshold (S22). The controller 130 may obtain touch coordinate information of a point where the touch of the stylus pen 20 occurs by using the valid touch signal.

For example, the controller 130 calculates touch coordinates by using the detection signal when the signal magnitude of the detection signal acquired during the second period exceeds the second threshold. The controller 130 does not calculate touch coordinates depending on the detection signal having a signal magnitude that is less than or equal to the second threshold when the signal magnitude of the detection signal acquired in the second period is less than or equal to the second threshold. In addition, when the signal magnitude of the detection signal acquired in the second period exceeds the second threshold, the controller 130 may calculate a touch area by using the detection signal.

Next, the first and second drivers 110 and 120 of the touch apparatus 10 will be described in detail with reference to FIG. 4 and FIG. 5.

Figure 4:
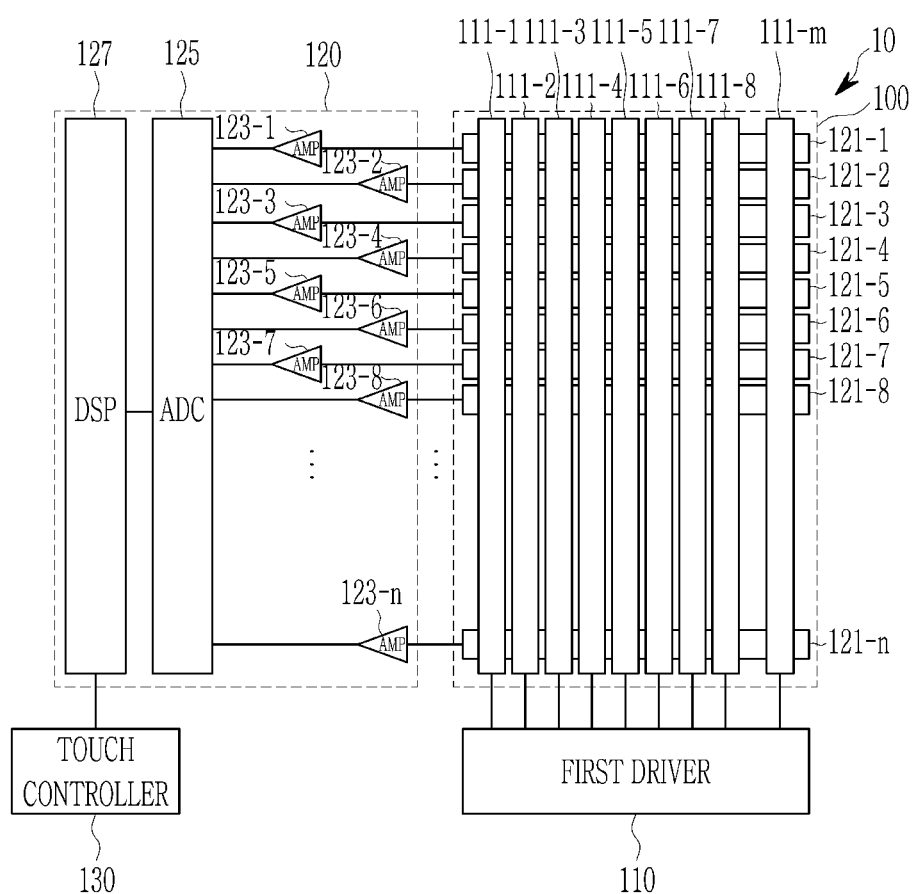
FIG. 4 and FIG. 5 illustrate the touch device of FIG. 1 in more detail.
Figure 5:
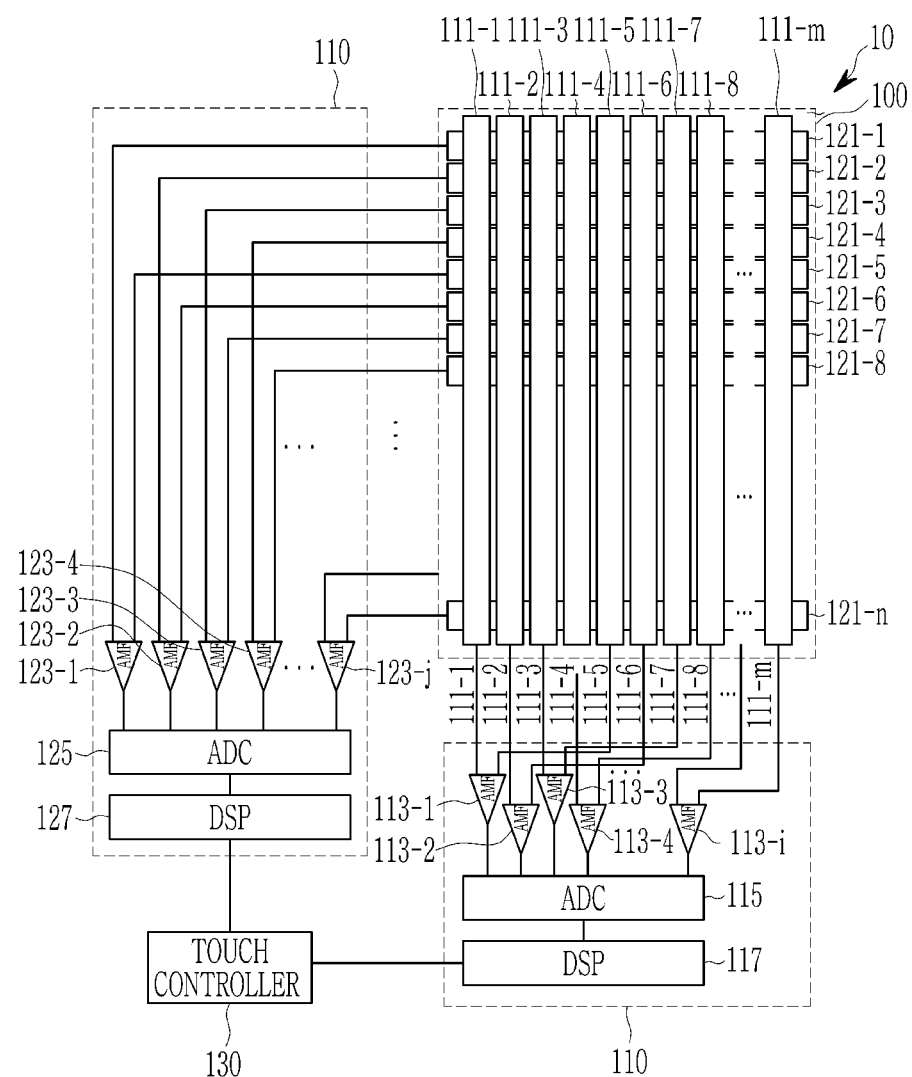

FIG. 4 and FIG. 5 illustrate the touch device of FIG. 1 in more detail.

First, FIG. 4 illustrates a touch apparatus in the first period. As illustrated, the first driver 110 is connected to the first touch electrodes 111-1 to 111-$m$.

The second driver 120 includes a plurality of amplifiers 123-1 to 123-$n$, an ADC unit 125, and a digital signal processor (DSP) 127. The second driver 120 may sequentially receive detection signals of the second touch electrodes 121-1 to 121-$n$ in units of one second touch electrode. Alternatively, the second driver 120 may simultaneously receive detection signals from the second touch electrodes 121-1 to 121-$n$.

Each of the amplifiers 123-1 to 123-$n$ is connected to a corresponding second touch electrode of the second touch electrodes 121-1 to 121-$n$. Specifically, each of the amplifiers 123-1 to 123-$n$ may be implemented as an amplifier in which one input terminal of two input terminals is connected to a ground or a DC voltage, and a sensing signal is inputted into the other input terminal. Each of the amplifiers 123-1 to 123-$n$ amplifies the sensing signals transferred from the second touch electrodes 121-1 to 121-$n$ in parallel to output them.

The ADC unit 125 converts an amplified detection signal into a digital signal. The signal processing unit 127 processes a plurality of amplified signals converted into digital signals to transfer them to the controller 130.

Next, FIG. 5 illustrates a touch in the second period. As illustrated, the first driver 110 includes a plurality of differential amplifiers 113-1 to 113-$i$, an ADC unit 115, and a digital signal processor (DSP) 117. The second driver 120 includes a plurality of differential amplifiers 123-1 to 123-$j$, an ADC unit 125, and a digital signal processor (DSP) 127.

The differential amplifiers 113-1 to 113-$i$ and 123-1 to 123-$j$ may be configured by changing the connection of the input terminals of the amplifiers 123-1 to 123-$n$. That is, an inequality i+j≤n may be satisfied. Specifically, two touch electrodes may be connected to one amplifier by connecting an input terminal of two input terminals of the amplifier 123-1 to which the ground or the DC voltage is connected to the corresponding second touch electrode 121-4 and an input terminal of two input terminals of the amplifier 123-1 to which the ground or the DC voltage is connected to the corresponding second touch electrode 121-5.

Input terminals of the respective differential amplifiers 113-1 to 113-$i$ and 123-1 to 123-$j$ are connected to two touch electrodes that are spaced apart from each other by at least one touch electrode. Each of the differential amplifiers 113-1 to 113-$i$ and 123-1 to 123-$j$ may differentially amplify and output two sense signals transferred from the touch electrode. Each of the differential amplifiers 113-1 to 113-$i$ and 123-1 to 123-$j$ receives differential sensing signals from two touch electrodes to differentially amplify them, and thus even when a driving signal is applied to a plurality of touch electrodes at the same time, it is not saturated.

Each of the differential amplifiers 113-1 to 113-$i$ and 123-1 to 123-$j$ may receive detection signals from two touch electrodes that are spaced apart from each other, rather than two adjacent touch electrodes. For example, each of the differential amplifiers 113-1 to 113-*i* and 123-1 to 123-*j* receives a sensing signal from two touch electrodes spaced apart from each other with one or more touch electrodes therebetween. In FIG. 5, the differential amplifier 113-1 receives detection signals from the first touch electrode 111-1 and the first touch electrode 111-5. When the differential amplifier 113-1 receives the detection signals from two adjacent touch electrodes (e.g., the first touch electrode 111-1 and the first touch electrode 111-2), the detection signals generated by the touch in a region between the first touch electrode 111-1 and the first touch electrode 111-2 are not sufficiently large even if they are differentially amplified by the differential amplifier 113-1. Therefore, when the differential amplifier 113-1 is connected with two adjacent first touch electrodes, touch sensitivity is deteriorated. However, since the differential amplifier 113-1 receives the detection signals from the first touch electrode 111-1 and the first touch electrode 111-5, the detection signal generated by the touch electrode at the touch input position may be differentially amplified to have a sufficiently large value, and the touch sensitivity may be improved.

Each of the ADC units 115 and 125 converts the differentially amplified detection signal into a digital signal. Each of the signal processing units 117 and 127 processes a plurality of differential amplified signals converted into digital signals to transfer them to the controller 130.

Such a touch detection method will be described together with reference to FIG. 6 to FIG. 10.

Figure 6:
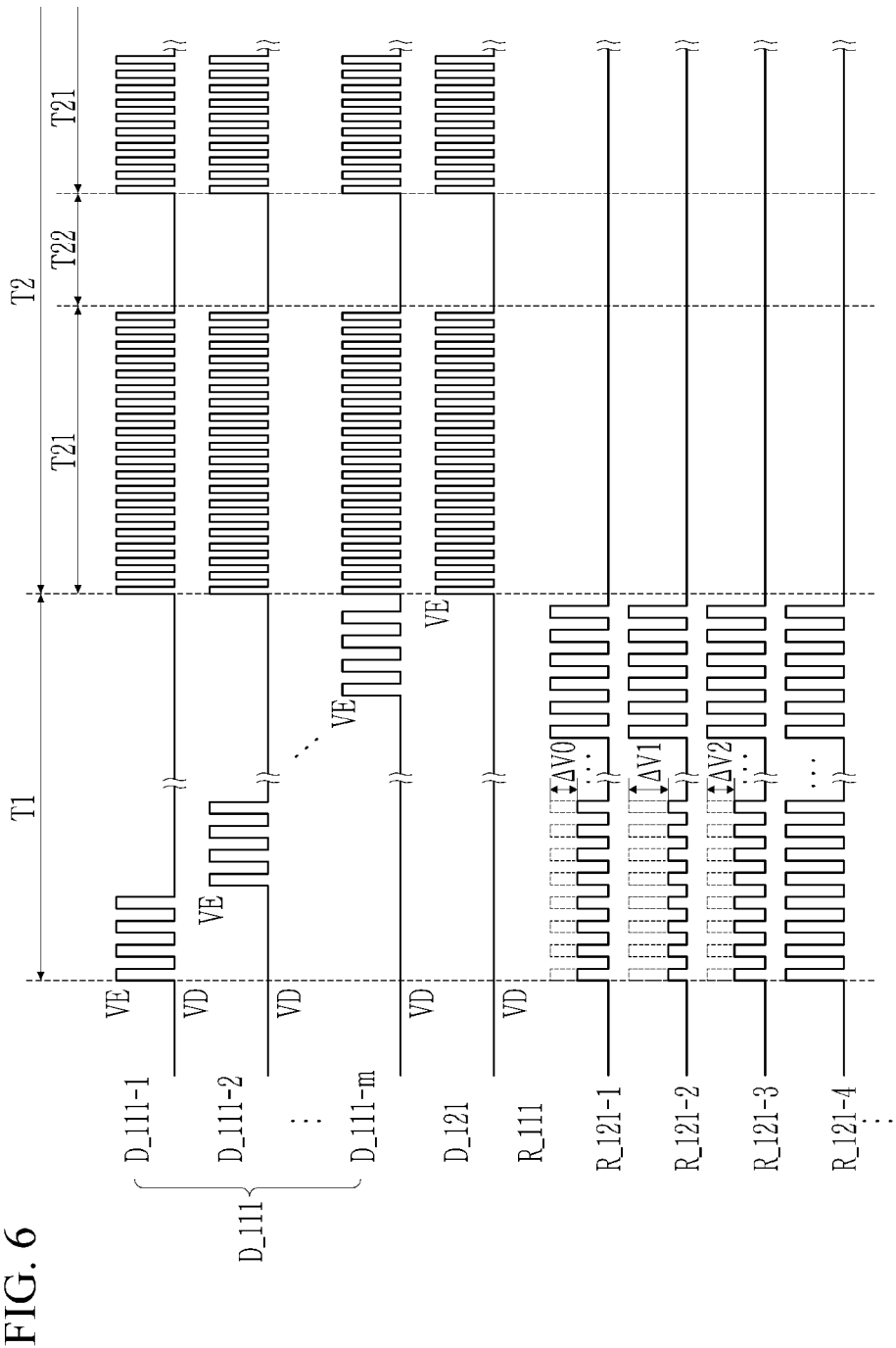
FIG. 6 illustrates a waveform diagram showing an example of a driving signal and a reception signal according to the touch detection method of FIG. 4.
Figure 7:
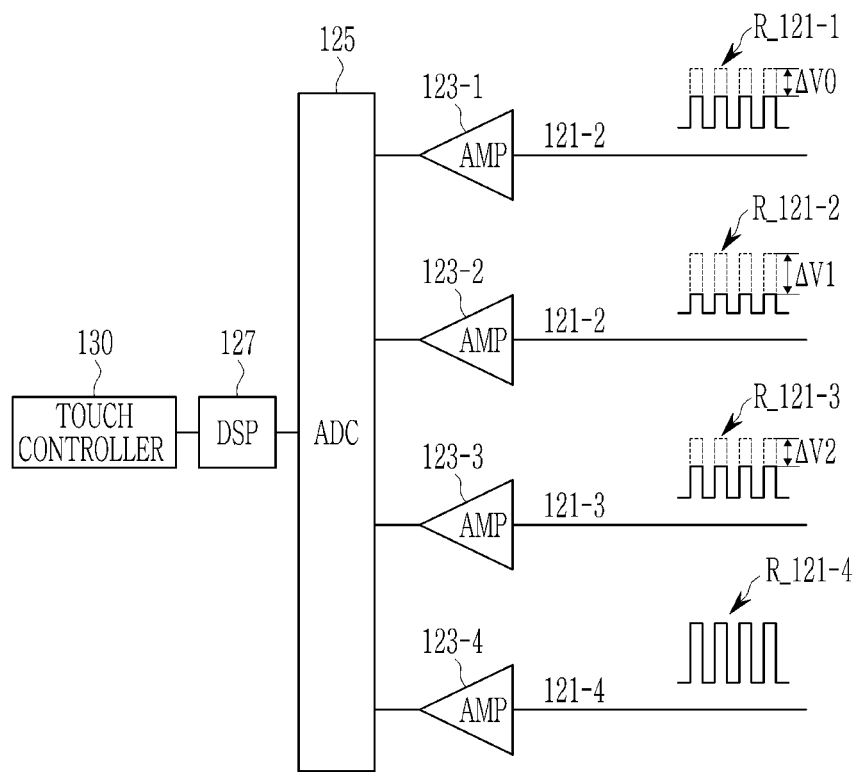
FIG. 7 illustrates a part of a receiver that outputs the reception signal of FIG. 6.

FIG. 6 illustrates a waveform diagram showing an example of a driving signal and a reception signal according to the touch detection method of FIG. 4, and FIG. 7 illustrates a part of a receiver that outputs the reception signal of FIG. 6.

In FIG. 6 and FIG. 7, it is assumed that there is a touch by a finger in a region where the first touch electrodes 111-1 and 111-2 and the second touch electrodes 121-1, 121-2, and 121-3 cross each other.

As illustrated in FIG. 6, during the first period T1, first driving signals D_111-1 to D_111-*m* are sequentially applied to the first touch electrodes 111-1 to 111-*m*. The first driving signals D_111-1 to D_111-*m* are pulse signals having an enable level voltage VE and a disable level voltage VD.

The second driver 120 receives the detection signals R_121-1 to R_121-*n* from the second touch electrodes 121-1 to 121-*n*.

The first driving signals D_111-1 to D_111-*m* are driving signals for detecting a touch input by a touch object other than the stylus pen 20, and are not limited to the waveform illustrated in FIG. 6. It is illustrated in FIG. 6 that the first driving signals D_111-1 to D_111-*m* are sequentially applied to the first touch electrodes 111-1 to 111-*m*, but driving signals having different frequencies (e.g., frequencies having an orthogonal relationship with each other) may be simultaneously applied to the first touch electrodes 111-1 to 111-*m*. In this case, the second driver 120 may receive detection signals depending on a touch from the second touch electrodes 121-1 to 121-*n*, and may separate the detection signals by the first touch electrodes 111-1 to 111-*m* using band pass filters of different frequency bands.

As illustrated in FIG. 7, the detection signal R_121-1 from the second touch electrode 121-1 may be amplified and outputted through the corresponding amplifier 123-1, the detection signal R_121-2 from the second touch electrode 121-2 may be amplified and outputted through the corresponding amplifier 123-1, the detection signal R_121-3 from the second touch electrode 121-3 may be amplified and outputted through the corresponding amplifier 123-1, and the detection signal R_121 from the second touch electrode 121-4 may be amplified and outputted through the corresponding amplifier 123-1. In the sensing signals R_121-1, R_121-2, and R_121-3, a change in signal magnitude caused by a touch occurs as ΔV0, ΔV1, and ΔV2, respectively.

The controller 130 may calculate, as touch coordinates, a point at which the first touch electrodes 111-1 and 111-2 to which a driving signal is applied when a change in signal magnitude is generated, and the second touch electrodes 121-1, 121-2 and 121-3 in which a signal magnitude change is generated, cross each other.

Next, during the first sub period T21 in the second period T2, the second driving signals D_111-1 to D_111-*m* are applied to all of the first touch electrodes 111-1 to 111-*m*, and the third driving signal D_121 is applied to all of the second touch electrodes 121-1 to 121-*n*. The second and third driving signals D_111 and D_121 are pulse signals having a voltage VE of an enable level and a voltage VD of a disable level, and having a frequency that is similar to that of a resonant frequency of the stylus pen 20.

During the first sub period T21, reception of detection signals from the first touch electrodes 111-1 to 111-*m* and the second touch electrodes 121-1 to 121-*n* is not performed.

During the second sub period T22, the first driver 110 and the second driver 120 may receive detection signals from both the first touch electrodes 111-1 to 111-*m* and the second touch electrodes 121-1 to 121-*n*.

The second period T2 includes a plurality of first sub periods T21 and second sub periods T22. For example, during the second period T2, a combination of the first sub period T21 and the second sub period T22 may be repeated eight times.

In FIG. 6 and FIG. 7, since the touch by the stylus pen 20 does not occur, no detection signal is received during the second sub period T22.

Figure 8:
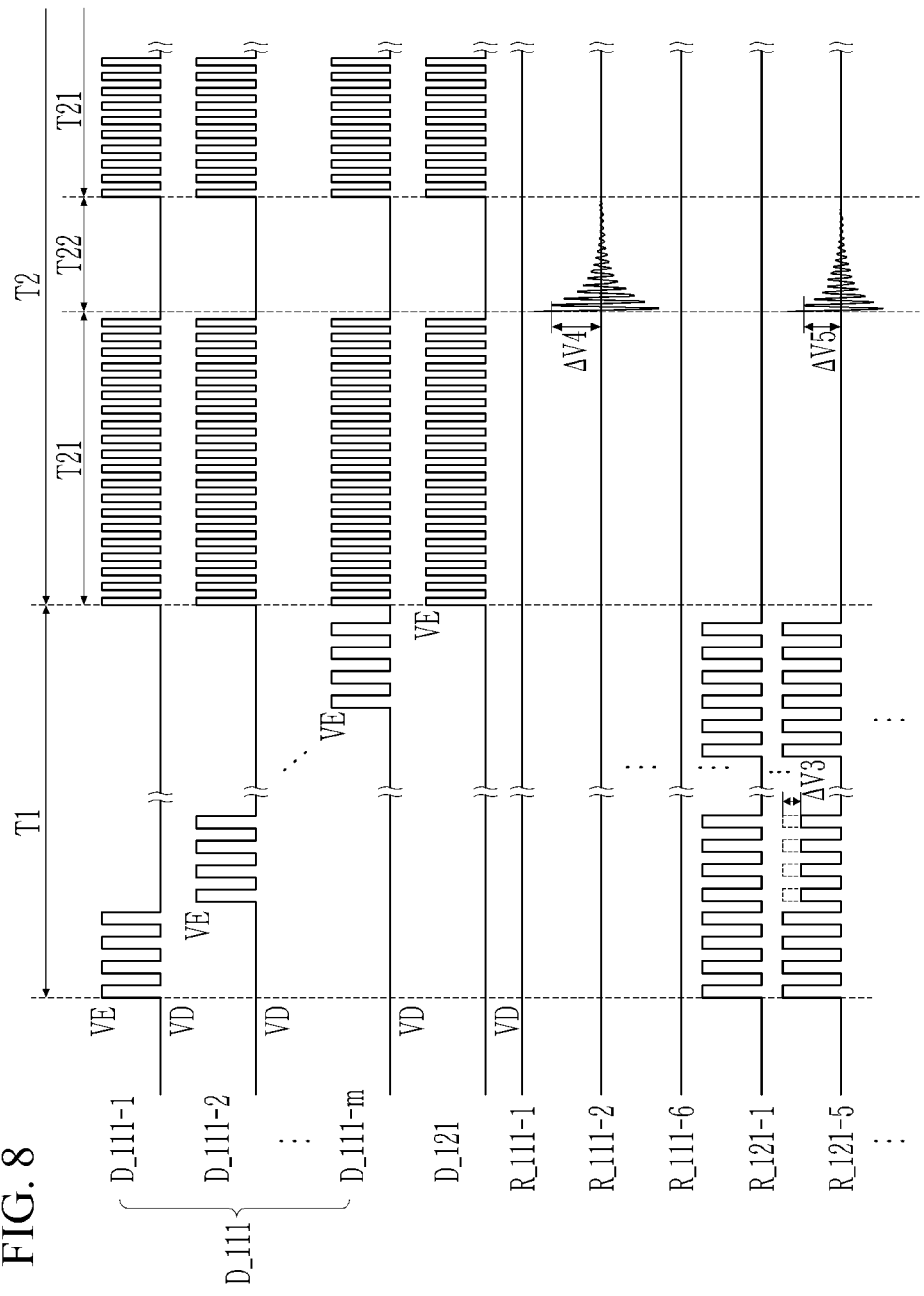
FIG. 8 illustrates a waveform diagram showing another example of a driving signal and a reception signal according to the touch detection method of FIG. 4.
Figure 9:
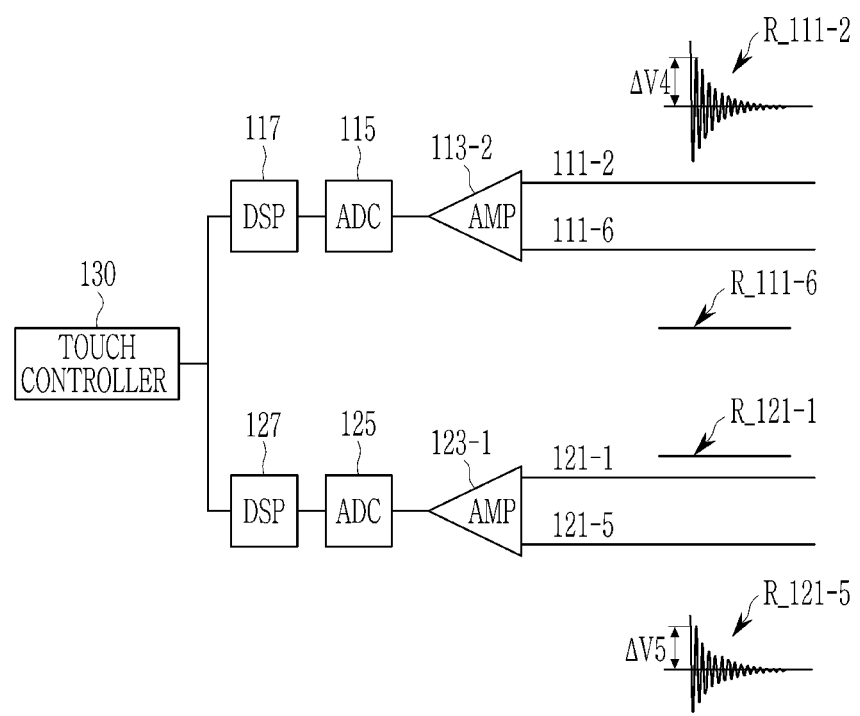
FIG. 9 illustrates a part of a receiver that outputs the reception signal of FIG. 8.

FIG. 8 illustrates a waveform diagram showing another example of a driving signal and a reception signal according to the touch detection method of FIG. 3, and FIG. 9 illustrates a part of a receiver that outputs the reception signal of FIG. 8.

In FIG. 8 and FIG. 9, it is assumed that there is a touch by the stylus pen 20 in a region where the first touch electrode 111-2 and the second touch electrode 121-5 cross each other.

As illustrated in FIG. 8, during the first period T1, first driving signals D_111-1 to D_111-*m* are sequentially applied to the first touch electrodes 111-1 to 111-*m*. The second driver 120 receives the detection signals R_121-1 to R_121-*n* from the second touch electrodes 121-1 to 121-*n*.

Since the stylus pen 20 is close to the second touch electrode 121-5, a signal magnitude change value ΔV3 of the detection signal R_121-5 from the touched second touch electrode 121-5 may be amplified and outputted through the amplifier 123-5.

Next, during the first sub period T21 in the second period T2, the second driving signals D_111-1 to D_111-*m* are applied to all of the first touch electrodes 111-1 to 111-*m*, and the third driving signal D_121 is applied to all of the second touch electrodes 121-1 to 121-*n*. The second and third driving signals D_111 and D_121 are pulse signals having a voltage VE of an enable level and a voltage VD of a disable level, and having a frequency that is similar to that of a resonant frequency of the stylus pen 20.

In FIG. 8, it is described that the enable level voltage VE of the second and third driving signals D_111 and D_121 and the disable level voltage VD are the same in phase signal, but the present invention is not limited thereto.

During the first sub period T21, a magnitude of the pen resonance signal increases according to a time when the second and third driving signals D_111 and D_121 are applied. The magnitude of the pen resonance signal is saturated after a certain time elapses During the first sub period T21, reception of detection signals from the first touch electrodes 111-1 to 111-*m* and the second touch electrodes 121-1 to 121-*n* is not performed.

Thereafter, when the first sub period T21 ends, the first driver 110 stops applying the driving signal D_111, and the second driver 120 also stops applying the driving signal D_121. During the second sub period T22 in the second period T2, the driving signals D_111 and D_121 are not applied to the first touch electrodes 111-1 to 111-*m* and the second touch electrodes 121-1 to 121-*n*.

During the second sub period T22, the first driver 110 and the second driver 120 may receive detection signals from both the first touch electrodes 111-1 to 111-*m* and the second touch electrodes 121-1 to 121-*n*. The first driver 110 and the second driver 120 may receive the pen resonance signal in the second sub period T22 to which the driving signals D_111 and D_121 are not applied as a detection signal.

As illustrated in FIG. 9, a signal magnitude difference ΔV4 between the detection signal R_111-2 from the first touch electrode 111-2 with touch and the detection signal R_111-6 from the first touch electrode 111-6 without touch may be amplified and outputted through the differential amplifier 113-2. Similarly, a signal magnitude difference ΔV5 between the detection signal R_121-5 from the second touch electrode 121-5 with touch and the detection signal R_121-1 from the second touch electrode 121-1 without touch may be amplified and outputted through the differential amplifier 123-1.

The controller 130 may calculate, as touch coordinates, a point at which the first touch electrodes 111-1 and 111-2 to which a driving signal is applied when a difference in signal magnitude is generated, and the second touch electrodes 121-2 and 121-3 in which a signal magnitude difference is generated, cross each other.

The controller 130 may calculate a touch position on the touch panel 100 through the detection signal received in the second sub period T22. In accordance with the touch apparatus 10 according to an exemplary embodiment, since the detection signal is received through both the plurality of first touch electrodes 111-1 to 111-*m* and the plurality of second touch electrodes 121-1 to 121-*n* during the second sub period, there is an advantage in that touch coordinates along two axes intersecting each other may be quickly obtained.

In addition, the same driving signals D_111 and D_121 are simultaneously applied to both the first touch electrodes 111-1 to 111-*m* and the second touch electrodes 121-1 to 121-*n* during the first period T1, thereby improving the resonant signal magnitude of the stylus pen 20 in response thereto is improved.

In the above description, the detection signal may be received at least once during the second sub period by at least one of the first driver 110 and the second driver 120. In addition, a time point at which the detection signal is received may be at least one time point in the second sub period T22, but the present invention is not limited thereto.

Next, the magnitude of the detection signal received in each of the first period T1 and the second period T2 will be described with reference to FIG. 10.

Figure 10:
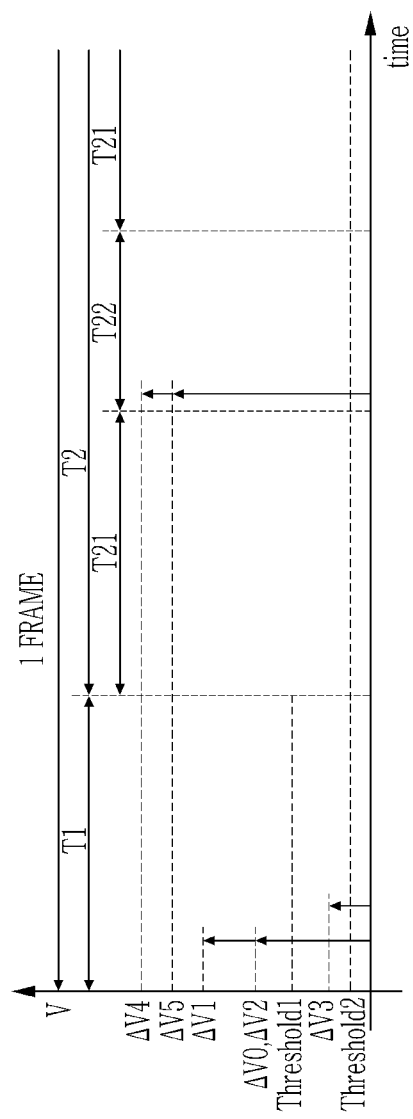
FIG. 10 illustrates a graph showing magnitudes of the reception signals of FIG. 6 and FIG. 8.

FIG. 10 illustrates a graph showing magnitudes of the reception signals of FIGS. 6 and 8. One frame 1 FRAME includes a first period T1 and a second period T2. The second period T2 includes a plurality of first sub periods T22 and second sub periods T22. When the second sub period T22 ends, a first period of the next frame is started.

During the first period T1, the magnitude difference of the detection signal generated by a finger is ΔV1 or ΔV2, which exceeds a first threshold value Threshold1. During the first period T1, the magnitude difference of the detection signal generated by the stylus pen 20 is ΔV3, which is less than or equal to the first threshold value Threshold1.

According to the exemplary embodiment, the controller 130 determines a detection signal having a magnitude difference exceeding the first threshold value Threshold1 as a valid touch signal during the first period T1. The first threshold value Threshold1 may be set such that a first detection signal generated by a user's body (a finger, a palm, etc.) is determined as a valid touch signal, and a second detection signal generated by the stylus pen 20 or a passive stylus pen is filtered.

Accordingly, the controller 130 determines the detection signal generated by the finger as a valid touch signal, and calculates touch coordinates by using the detection signal. The controller 130 determines that the detection signal generated by the stylus pen 20 is not a valid touch signal, and does not calculate the touch coordinates.

During the second period T2, the magnitude difference of the detection signal generated by the stylus pen 20 is ΔV4 or ΔV5, which exceeds a second threshold value Threshold2.

The controller 130 determines a detection signal having a magnitude difference exceeding the second threshold value Threshold2 as a valid touch signal during the second period T2. Therefore, the controller 130 determines the detection signal generated by the stylus pen 20 as a valid touch signal, and calculates touch coordinates by using the detection signal.

Conventionally, when different types of objects contact the touch sensor together, the touch coordinates are calculated using only the detection signal in the first period T1, and thus it is difficult to accurately calculate the touch position by a touch object having a small change in signal magnitude.

According to the exemplary embodiments, the first threshold value Threshold1 may be set such that a first detection signal generated by a user's body (a finger, a palm, etc.) is determined as a valid touch signal, and a second detection signal generated by the stylus pen 20 or a passive stylus pen is filtered. As a result, the touch coordinates of the touch object having the large change in signal magnitude may be accurately detected during the first period T1, and the touch coordinates of the touch object having the small change in signal magnitude may be detected in the second period T2.

Next, types of the second and third driving signals D_111 and D_121 that may be applied to the first touch electrodes 111-1 to 111-*m* and the second touch electrodes 121-1 to 121-*n* will be described with reference to FIG. 11.

Figure 11:
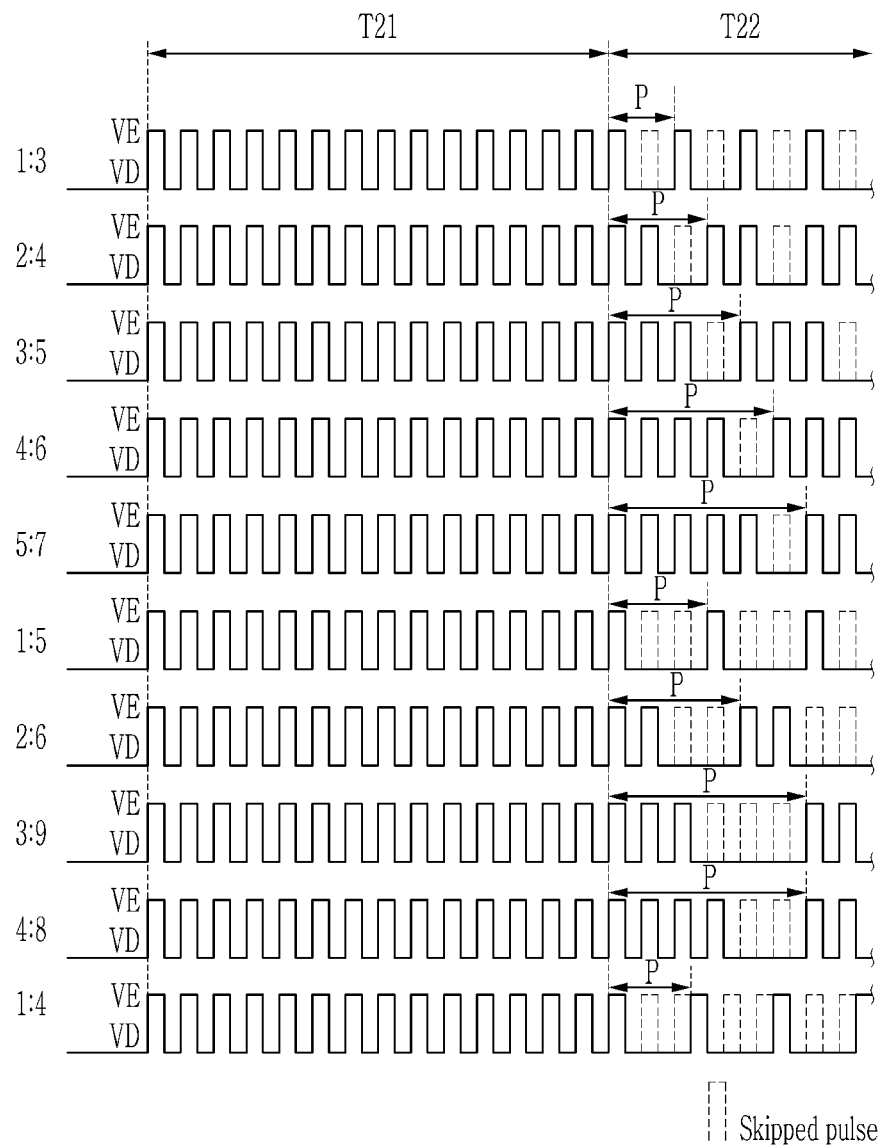
FIG. 11 illustrates waveform diagrams showing a driving signal according to various aspects of an exemplary embodiment.

FIG. 11 illustrates waveform diagrams showing a driving signal according to various aspects of an exemplary embodiment.

During the first sub period T21, the driving signals D_111 and D_121 in which a pulse of enable level VE is repeated at a predetermined cycle is applied to all of at least one type of the first touch electrodes 111-1 to 111-*m* and the second touch electrodes 121-1 to 121-*n*. During the first sub period T21, the resonance signal of the stylus pen 20 may be quickly reached (i.e., saturated) by the driving signals D_111 and D_121.

During the second sub period T22, the driving signals D_111 and D_121 having a plurality of periods having different lengths of the disable level periods is applied to all of at least one type of the first touch electrodes 111-1 to 111-*m* and the second touch electrodes 121-1 to 121-*n*.

For example, when a duty ratio of the driving signals outputted during the first sub period T21 (a ratio of the disable level period to the enable level period during one repeated period P) is 1:1, the driving signals outputted during the second sub period T22 may have a duty ratio of a:2b+1, a:2b+2, a:2b+3, a:2b+4, a:(3b+1), a:2(b+3)+1, a:2(b+3), a:(2b+1), . . . , and the like. Herein, a and b are positive integers. A time period corresponding to one cycle P of the driving signal outputted during the second sub period T22 may include a period in which the enable level period and the disable level period are repeated at least n times, and a period in which the disable level period is maintained at least 2n times. The enable level period corresponds to a period in which the driving signal has an enable level VE, and the disable level period corresponds to a period in which the driving signal has a disable level VE. The duty ratio of the driving signal is merely an example, and may include all ratios for allowing the resonance signal of the stylus pen 20 having reached a predetermined level to be maintained at an effective level.

The resonance signal of the stylus pen 20 reaching the predetermined level by the first driving signal during the first sub period T21 may be maintained at an effective level by the driving signal during the second sub period T22. Herein, the effective level indicates a level at which the controller 130 can detect the resonance signal of the stylus pen 20 as a touch signal.

The driving signal during the second sub period T22 may be a signal in which at least one pulse is periodically omitted from the first driving signal during the first sub period T21. As described above, since the driving signal during the second sub period T22 is outputted in a form in which at least one pulse is periodically omitted compared to the driving signal during the first sub period T21, the driving signal during the first sub period T21 and the driving signal during the second sub period T22 may have different pulse rates. That is, the driving signal during the second sub period T22 may have a lower pulse speed than the driving signal during the sub period T21. Herein, a pulse rate may be a number of pulses outputted per unit time (e.g., 1 s).

As a number of skipped pulses of the driving signal decreases during the second sub period T22, energy transferred from the touch apparatus 10 to the stylus pen 20 may increase. Therefore, as the number of skipped pulses of the driving signal decreases during the second sub period T22, the signal level of the pen resonance signal generated during the second sub period T22 increases. In addition, as the number of skipped pulses of the driving signal increases during the second subinterval T22, energy consumed for output of the driving signal may decrease. Therefore, as the number of pulses skipped by the driving signal increases during the second sub period T22, energy consumed by the touch apparatus 10 during the second sub period T22 may be reduced.

Figure 12:
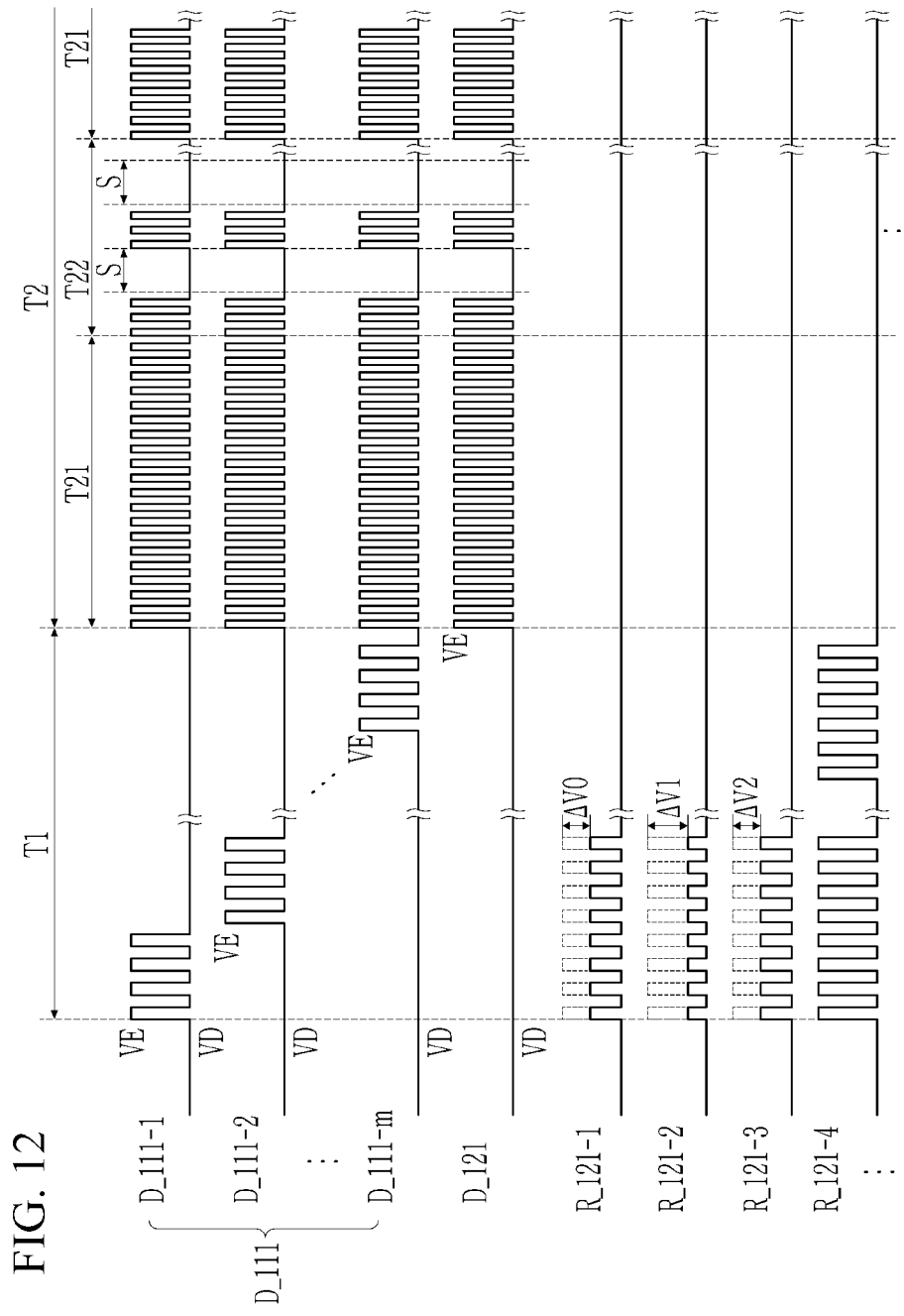
FIG. 12 and FIG. 13 illustrate waveform diagrams showing a driving signal and a reception signal when the driving signal of FIG. 11 is applied according to the touch detection method of FIG. 4.
Figure 13:
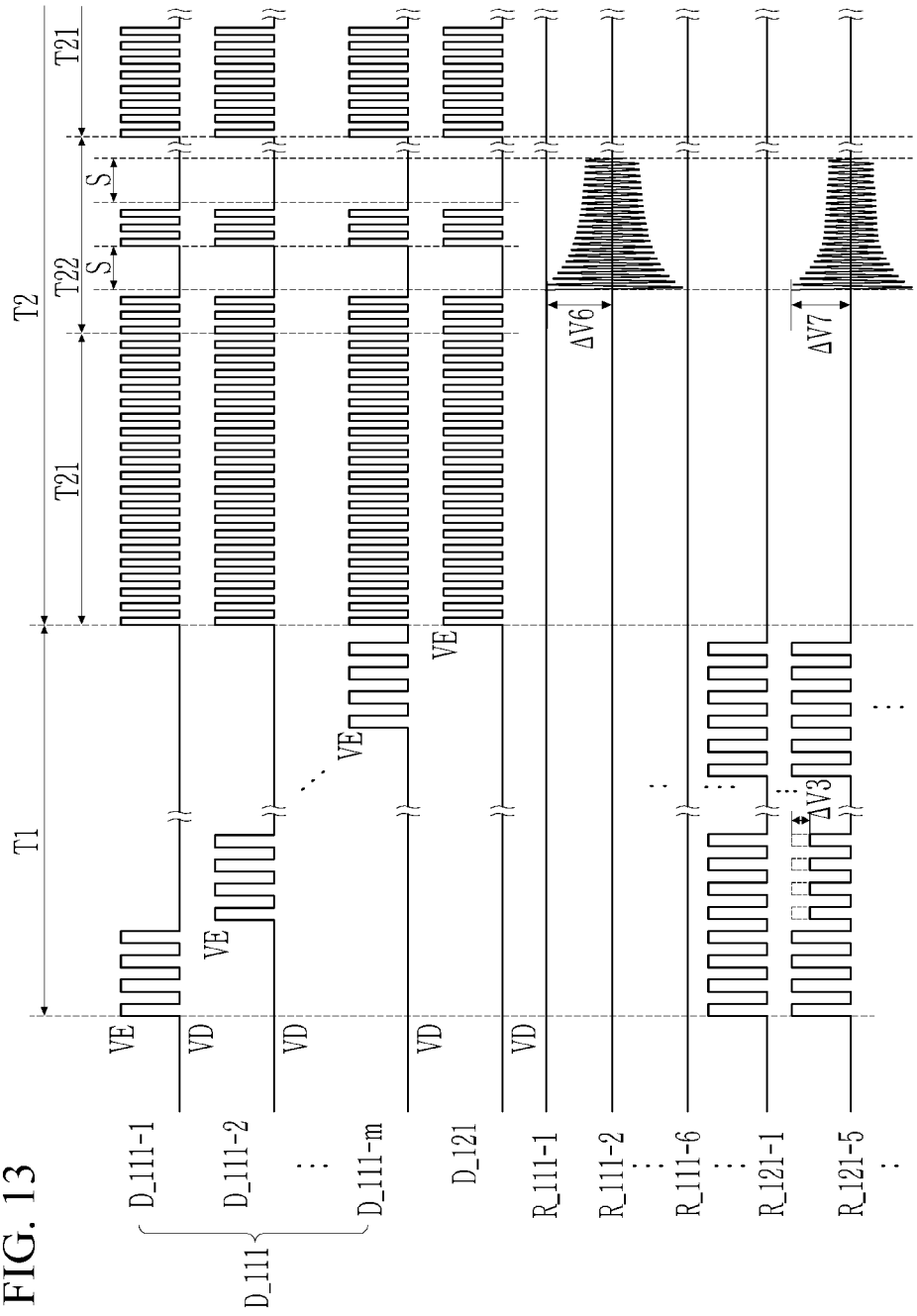

Next, a touch detection method in the case of applying the driving signal during the second sub period T22 described with reference to FIG. 11 will be described with reference to FIG. 12 and FIG. 13. In FIG. 12 and FIG. 13, it is assumed that the driving signal applied to the touch electrodes 111-1 to 111-*m* and 121-1 to 121-*n* during the second sub period T22 has a non-skipped vs. skipped pulse ratio of 1:1.

FIG. 12 illustrates a waveform diagram showing an example of a driving signal and a reception signal when the driving signal of FIG. 11 is applied according to the touch detection method of FIG. 4.

In FIG. 12, it is assumed that there is a touch by a finger in a region where the first touch electrodes 111-1 and 111-2 and the second touch electrodes 121-1, 121-2, and 121-3 cross each other.

As illustrated in FIG. 12, during the first period T1, first driving signals D_111-1 to D_111-*m* are sequentially applied to the first touch electrodes 111-1 to 111-*m*. The first driving signals D_111-1 to D_111-*m* are pulse signals having an enable level voltage VE and a disable level voltage VD.

The second driver 120 receives the detection signals R_121-1 to R_121-*n* from the second touch electrodes 121-1 to 121-*n*.

The detection signal R_121-1 from the second touch electrode 121-1 may be amplified and outputted through the corresponding amplifier 123-1, the detection signal R_121-2 from the second touch electrode 121-2 may be amplified and outputted through the corresponding amplifier 123-1, the detection signal R_121-3 from the second touch electrode 121-3 may be amplified and outputted through the corresponding amplifier 123-1, and the detection signal R_121 from the second touch electrode 121-4 may be amplified and outputted through the corresponding amplifier 123-1. In the sensing signals R_121-1, R_121-2, and R_121-3, a change in signal magnitude caused by a touch occurs as ΔV0, ΔV1, and ΔV2, respectively.

The controller 130 may calculate, as touch coordinates, a point at which the first touch electrodes 111-1 and 111-2 to which a driving signal is applied when a change in signal magnitude is generated, and the second touch electrodes 121-1, 121-2 and 121-3 in which a signal magnitude change is generated, cross each other.

Next, during the first sub period T21 in the second period T2, the second driving signals D_111-1 to D_111-*m* are applied to all of the first touch electrodes 111-1 to 111-*m*, and the third driving signal D_121 is applied to all of the second touch electrodes 121-1 to 121-*n*. The second and third driving signals D_111 and D_121 are pulse signals having a voltage VE of an enable level and a voltage VD of a disable level, and having a frequency that is similar to that of a resonant frequency of the stylus pen 20.

During the first sub period T21, reception of detection signals from the first touch electrodes 111-1 to 111-*m* and the second touch electrodes 121-1 to 121-*n* is not performed.

During the second sub period T22, the first driver 110 and the second driver 120 may transfer a driving signal including a period in which the enable level period and the disable level period are repeated at least n times (n=3 in FIG. 12, but it is not limited thereto), and a period in which the disable level period is maintained at least 2n times, as a time period corresponding to one cycle P, to both the first touch electrodes 111-1 to 111-*m* and the second touch electrodes 121-1 to 121-*n*. The period in which the enable level period and the disable level period are repeated at least n times and a period in which the enable level period is maintained at least 2n times may be repeated at least once in the second sub period T22.

In addition, while the driving signal applied to the first touch electrodes 111-1 to 111-*m* is the disable level, and the driving signal applied to the second touch electrodes 121-1 to 121-*n* is the disabled level, the first and second drivers 110 and 120 may simultaneously receive detection signals from both the first touch electrodes 111-1 to 111-*m* and the second touch electrodes 121-1 to 121-*n*.

In FIG. 12, since the touch by the stylus pen 20 does not occur, no detection signal is received during the second sub period T22.

FIG. 13 illustrates a waveform diagram showing another example of a driving signal and a reception signal when the driving signal of FIG. 11 is applied according to the touch detection method of FIG. 3.

In FIG. 13, it is assumed that there is a touch by the stylus pen 20 in a region where the first touch electrode 111-2 and the second touch electrode 121-5 cross each other.

As illustrated in FIG. 13, during the first period T1, first driving signals D_111-1 to D_111-m are sequentially applied to the first touch electrodes 111-1 to 111-m. The second driver 120 receives the detection signals R_121-1 to R_121-n from the second touch electrodes 121-1 to 121-n.

Since the stylus pen 20 is close to the second touch electrode 121-5, a signal magnitude change value ΔV3 of the detection signal R_121-5 from the touched second touch electrode 121-5 may be amplified and outputted through the amplifier 123-5.

Next, during the first sub period T21 in the second period T2, the second driving signals D_111-1 to D_111-m are applied to all of the first touch electrodes 111-1 to 111-m, and the third driving signal D_121 is applied to all of the second touch electrodes 121-1 to 121-n. The second and third driving signals D_111 and D_121 are pulse signals having a voltage VE of an enable level and a voltage VD of a disable level, and having a frequency that is similar to that of a resonant frequency of the stylus pen 20.

In FIG. 8, it is described that the enable level voltage VE of the second and third driving signals D_111 and D_121 and the disable level voltage VD are the same in phase signal, but the present invention is not limited thereto. During the first sub period T21, a magnitude of the pen resonance signal increases according to a time when the second and third driving signals D_111 and D_121 are applied. The magnitude of the pen resonance signal is saturated after a certain time elapses.

During the first sub period T21, reception of detection signals from the first touch electrodes 111-1 to 111-m and the second touch electrodes 121-1 to 121-n is not performed.

During the second sub period T22, the first driver 110 and the second driver 120 may transfer a driving signal including a period in which the enable level period and the disable level period are repeated at least n times (n=3 in FIG. 12, but it is not limited thereto), and a period in which the disable level period is maintained at least 2n times, as a time period corresponding to one cycle P, to both the first touch electrodes 111-1 to 111-m and the second touch electrodes 121-1 to 121-n. In addition, during a period S during which the driving signal applied to the first touch electrodes 111-1 to 111-m is the disable level, and the driving signal applied to the second touch electrodes 121-1 to 121-n is the disable level, the first and second drivers 110 and 120 may simultaneously receive detection signals from both the first touch electrodes 111-1 to 111-m and the second touch electrodes 121-1 to 121-n.

During the second sub period T22, the first driver 110 and the second driver 120 may receive detection signals from both the first touch electrodes 111-1 to 111-m and the second touch electrodes 121-1 to 121-n. The first driver 110 and the second driver 120 may receive the pen resonance signal in the second sub period T22 to which the driving signals D_111 and D_121 are not applied as a detection signal.

A signal magnitude difference ΔV6 between the detection signal R_111-2 from the first touch electrode 111-2 with touch and the detection signal R_111-6 from the first touch electrode 111-6 without touch may be amplified and outputted through the differential amplifier 113-2. Similarly, a signal magnitude difference ΔV7 between the detection signal R_121-5 from the second touch electrode 121-5 with touch and the detection signal R_121-1 from the second touch electrode 121-1 without touch may be amplified and outputted through the differential amplifier 123-1.

The controller 130 may calculate, as touch coordinates, a point at which the first touch electrodes 111-1 and 111-2 to which a driving signal is applied when a difference in signal magnitude is generated, and the second touch electrodes 121-2 and 121-3 in which a signal magnitude difference is generated, cross each other.

The controller 130 may calculate a touch position on the touch panel 100 through the detection signal received in the second sub period T22. In accordance with the touch apparatus 10 according to an exemplary embodiment, since the detection signal is received through both the plurality of first touch electrodes 111-1 to 111-m and the plurality of second touch electrodes 121-1 to 121-n during the second sub period, there is an advantage in that touch coordinates along two axes intersecting each other may be quickly obtained.

In addition, the same driving signals D_111 and D_121 are simultaneously applied to both the first touch electrodes 111-1 to 111-m and the second touch electrodes 121-1 to 121-n during the first period T1, thereby improving the resonant signal magnitude of the stylus pen 20 in response thereto.

In the above description, the detection signal may be received at least once during the second sub period by at least one of the first driver 110 and the second driver 120. In addition, a time point at which the detection signal is received may be at least one time point in the second sub period T22, but the present invention is not limited thereto.

Next, a touch area depending on a touch object will be described with reference to FIG. 14 and FIG. 15.

Figure 14:
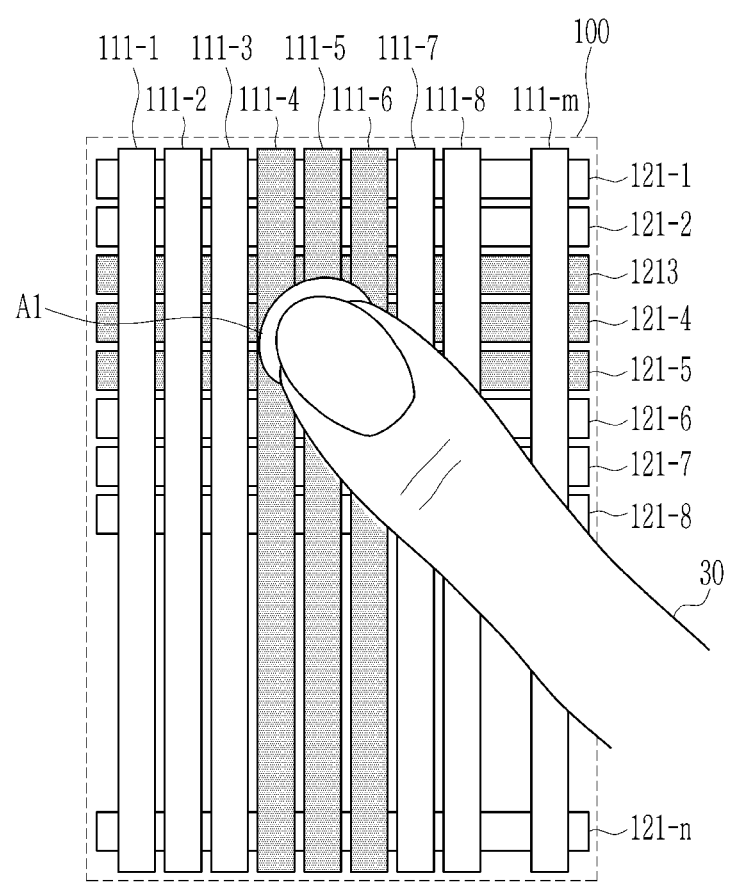
FIG. 14 and FIG. 15 illustrate touch areas of different objects.
Figure 15:
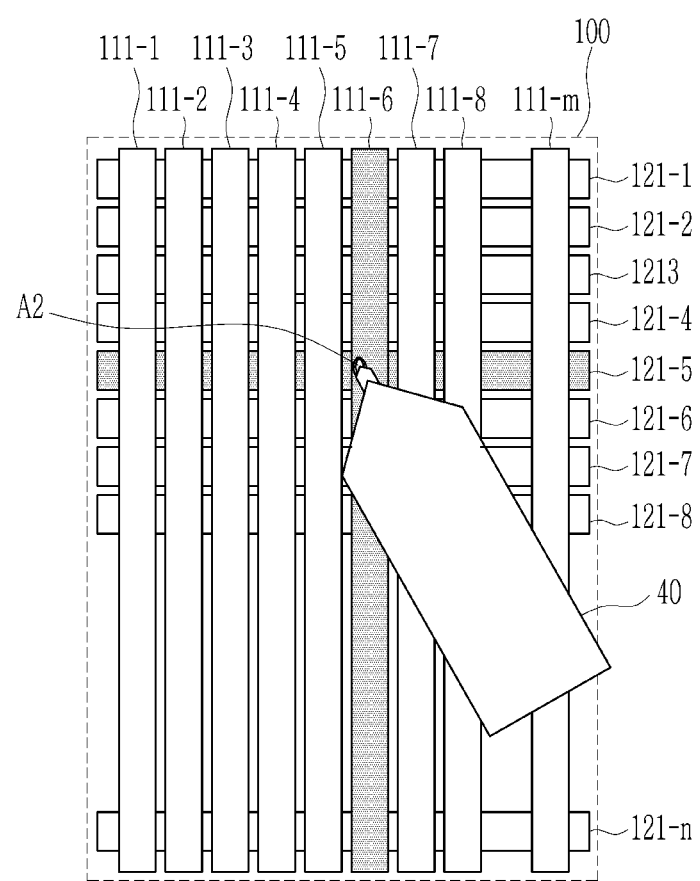

FIG. 14 and FIG. 15 illustrate touch areas of different objects.

As illustrated in FIG. 14, a finger 30 touches the touch panel 100. A plurality of touch electrodes 111-3 to 111-5 and 121-4 to 121-6 may be disposed near an area A1 where a tip of the finger 30 contacts the touch panel 100. An area of the touch area A1 may be calculated by using detection signals received from the touch electrodes 111-3 to 111-5 and 121-4 to 121-6.

As illustrated in FIG. 15, the stylus pen 40 touches the touch panel 100. One first touch electrode 111-6 and one second touch electrode 121-6 may be disposed near an area A2 where a tip of the stylus pen 40 contacts the touch panel 100. Alternatively, two first touch electrodes and two second touch electrodes may be disposed near an area A2 where the tip of the stylus pen 40 contacts the touch panel 100. That is, a number of the touch electrodes disposed in the area A2 where the tip of the stylus pen 40 contacts the touch panel 100 is smaller than that of the touch electrodes disposed in the area A1 where the finger 30 contacts the touch panel 100. Therefore, the area of the touch area A2 generated by the touch of the stylus pen 40 is calculated to be a very small value compared to the touch area A1 generated by the touch of the finger 30.

According to the exemplary embodiments, the touch apparatus 10 may transfer touch data including information related to the area of the touch area to a host apparatus. In this way, the host apparatus may identify whether the touch object is the finger 30 or the stylus pen 40.

According to the exemplary embodiments, the touch apparatus 10 may determine the touch object depending on the calculated area of the touch area, and may transfer touch data including information related to the determined touch object to the host apparatus.

This will be described with reference to FIG. 16 and FIG. 17.

Figure 16:
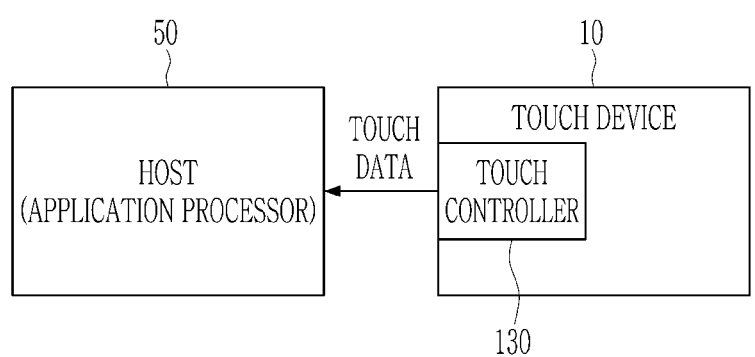
FIG. 16 illustrates a block diagram showing a touch apparatus and a host that performs the driving method of FIG. 4.
Figure 17:
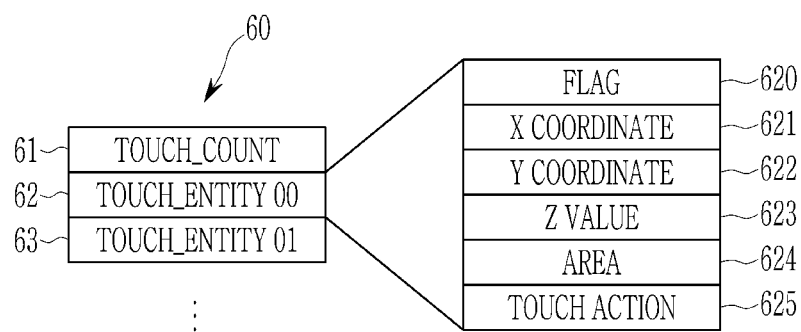
FIG. 17 illustrates an example of touch data provided to a host from a touch apparatus.

FIG. 16 illustrates a block diagram showing a touch apparatus and a host that perform the driving method of FIG. 4, and FIG. 17 illustrates an example of touch data provided to a host from a touch apparatus.

Referring to FIG. 16, a host 50 may receive touch data from the controller 130 included in the touch apparatus 10. For example, the host 50 may be a mobile system-on-chip (SoC), an application processor (AP), a media processor, a microprocessor, a central processing unit (CPU), or a similar device thereto.

After one frame ends, the touch apparatus 10 may generate information related to the touch input during one frame as touch data to transfer it to the host 50.

Alternatively, when the first period T1 ends, the touch apparatus 10 may generate touch information that is inputted during the first period T1 as touch data to transfer it to the host 50, and when the second period T2 that is continuous to the first period T1 ends, it may generate information related to a touch that is inputted during the second period T2 as touch data to transfer it to the host 50.

Referring to FIG. 17, touch data 60 may include a touch count field 61 and one or more touch entity fields 62 and 63.

In the touch count field 61, a value indicating a number of touches that are inputted during one frame period may be written. For example, when touch coordinates by one finger are calculated during the first period T1 in one frame period, and when touch coordinates by one stylus pen are calculated during the second period T2, a value indicating that two touches are inputted is written in the touch count field 61.

The touch entity fields 62 and 63 include fields indicating information related to each touch input. For example, the touch entity fields 62 and 63 may include a flag field 620, an X-axis coordinate field 621, a Y-axis coordinate field 622, a Z-value field 623, an area field 624, and a touch action field 625.

A number of the touch entity fields 62 and 63 may be equal to a value written in the touch count field 61.

A value representing a touch object may be written in the flag field 620. For example, a finger, a palm, and a stylus pen may be filled in the flag field 620 with different values. Values representing the calculated touch coordinates may be written in the X-axis coordinate field 621 and the Y-axis coordinate field 622. A value corresponding to the signal strength of the detection signal may be written in the Z-value field 623. A value corresponding to an area of the touched area may be written in the area field 624.

According to exemplary embodiments, the host apparatus 50 receiving touch data 60 determines that a touch object is the finger 30 when the touch area is larger than the threshold by using the value of the area field 624, and determines that the touch object is the stylus pen 40 when the touch area is less than or equal to the threshold.

According to the exemplary embodiments, the host apparatus 50 receiving the touch data 60 may identify whether the touch object is the finger 30 or the stylus pen 40 by using the value of the flag field 620.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A touch apparatus comprising:
a touch panel configured to include a plurality of touch electrodes;
a touch driver configured to apply a first driving signal to a first touch electrode of the touch electrodes during a first period, and a second driving signal to the touch electrodes during a second period subsequent to the first period; and
a touch controller configured to determine a first detection signal as a valid touch signal among detection signals including the first detection signal and a second detection signal based on whether a signal strength of the detection signals received in response to the first driving signal exceeds a first threshold during the first period,
wherein the first detection signal is generated by a first touch object and the second detection signal is generated by a second touch object, and
the first threshold is set to filter the second detection signal,
wherein the touch driver applies the second driving signal to the touch electrodes, and receives a third detection signal generated by resonance of the second touch object in response to the second driving signal while the second driving signal has a disable level, during the second period.

2. The touch apparatus of claim 1, wherein
the third detection signal is determined as a valid touch signal based on whether a signal strength of the third detection signal exceeds a second threshold.

3. The touch apparatus of claim 1, wherein
the touch controller calculates an area of a touch area by using the valid touch signal, and generates information for identifying a touch object as the first touch object or the second touch object depending on a size of the area.

4. The touch apparatus of claim 3, wherein
the touch controller generates information identifying that the touch object is the second touch object when the area is less than or equal to a threshold.

5. The touch apparatus of claim 4, wherein the second touch object is a stylus pen.

6. The touch apparatus of claim 3, wherein
the touch controller generates information identifying that the touch object is the first touch object when the area exceeds a threshold.

7. The touch apparatus of claim 6, wherein
the first touch object includes at least one of a finger and a palm.

8. The touch apparatus of claim 1, wherein
the first driving signal is a pulse signal having a first frequency and the second driving signal is a pulse signal having a second frequency, and
the first frequency and the second frequency are different from each other.

9. The touch apparatus of claim 1, wherein
the touch driver applies the second driving signal to all of the touch electrodes in phase during the second period, and receives a detection signal from all of the touch electrodes when the second driving signal has a disable level.

10. The touch apparatus of claim 9, wherein the touch driver applies the second driving signal during the first sub period in the second period, and stops applying the second driving signal during the second sub period in the second period.

11. The touch apparatus of claim 9, wherein
the touch driver applies the second driving signal during the first sub period in the second period, and applies a third driving signal having a different ratio of a disable level period to an enable level period to all of the touch electrodes in one repeated cycle by comparing it with the second driving signal during the second sub period in the second period.

12. The touch apparatus of claim 11, wherein
the third driving signal has a ratio of the disable level period to the enable level period which is at least one of a:2b+1, a:2b+2, a:2b+3, a:2b+4, a:(3b+1), a:2(b+3)+1, a:2(b+3), and a:(2b+1), in one repeated cycle, and a and b are positive integers.

13. (Currently Amended I) The touch apparatus of claim 1, wherein
the touch electrodes include the first touch electrodes in plural and pluralities of the second touch electrodes,
the first touch electrodes extend in a first direction and are arranged in a second direction crossing the first direction, and
the second touch electrodes extend in the second direction and are arranged in the first direction.

14. The touch apparatus of claim 13, wherein
the touch driver receive a detection signal from all of the second touch electrodes while applying the first driving signal to the first touch electrode.

15. The touch apparatus of claim 13, wherein
the touch driver includes a first driver connected with the first touch electrodes and a second driver connected with the second touch electrodes, and
the first driver includes a differential amplifier connected to two first touch electrodes and an ADC unit for converting the differentially amplified signal into a digital signal.

16. A touch detection method comprising:
applying a first driving signal to a first touch electrode among a plurality of touch electrodes included in a touch panel during a first period;
determining a first detection signal as a valid touch signal among detection signals including the first detection signal and a second detection signal based on whether a signal strength of the detection signals received in response to the first driving signal exceeds a first threshold during the first period, wherein the first detection signal is generated by a first touch object and the second detection signal is generated by a second touch object, and the first threshold is set to filter the second detection signal;
calculating touch coordinates by using the valid touch signal;
applying a second driving signal to the touch electrodes during a second period after the first period;
receiving only a third detection signal generated by resonance of the second touch object in response to the second driving signal while the second driving signal has a disable level, during the second period; and
determining the third detection signal as a valid touch signal based on whether a signal strength of the third detection signal exceeds a second threshold.

17. The touch detection method of claim 16, wherein
the applying of the first driving signal to the first touch electrode among the touch electrodes included in the touch panel during the first period
includes receiving a detection signal from all of second touch electrodes while applying the first driving signal to the first touch electrode.

18. The touch detection method of claim 16, wherein
the applying of the second driving signal to the touch electrodes during the second period after the first period includes:
applying the second driving signal to all of the touch electrodes in phase during the second period; and
receiving a detection signal from all of the touch electrodes while the second driving signal has a disable level.

* * * * *